United States Patent [19]

Iritani et al.

[11] Patent Number: 5,501,267
[45] Date of Patent: Mar. 26, 1996

[54] AIR CONDITIONING APPARATUS FOR AN ELECTRIC VEHICLE USING LEAST POWER CONSUMPTION BETWEEN COMPRESSOR AND ELECTRIC HEATER

[75] Inventors: Kunio Iritani, Anjo; Akira Isaji, Nishio, both of Japan

[73] Assignee: Nippondenso Co., Ltd., Japan

[21] Appl. No.: 997,365

[22] Filed: Dec. 28, 1992

[30] Foreign Application Priority Data

Dec. 27, 1991 [JP] Japan .................................. 3-346691
Dec. 1, 1992 [JP] Japan .................................. 4-322010

[51] Int. Cl.$^6$ .................................................. F25B 29/00
[52] U.S. Cl. .............. 165/29; 165/11.1; 165/42; 165/43; 237/21 B
[58] Field of Search .............. 165/29, 11.1, 42, 165/43; 237/2 B

[56] References Cited

U.S. PATENT DOCUMENTS

| | | | |
|---|---|---|---|
| 3,738,117 | 6/1973 | Engel . | |
| 4,266,599 | 5/1981 | Saunders et al. | 165/29 |
| 4,353,409 | 10/1982 | Saunders et al. | 165/29 |
| 4,627,483 | 12/1986 | Harshbarger et al. | 165/29 |
| 4,627,484 | 12/1986 | Harshbarger et al. | 165/29 |
| 4,795,088 | 1/1989 | Kobayashi et al. | 165/29 |
| 4,994,958 | 2/1991 | Iida | 165/43 |
| 5,325,912 | 7/1994 | Hotta et al. | 237/2 B |

FOREIGN PATENT DOCUMENTS

| | | | |
|---|---|---|---|
| 2554563 | 5/1985 | France | 165/29 |
| 3702080 | 8/1987 | Germany | 165/29 |
| 0015217 | 1/1985 | Japan | 165/29 |
| 0003940 | 1/1986 | Japan | 165/29 |
| 0163548 | 6/1989 | Japan | 165/29 |
| 1239353 | 9/1989 | Japan . | |

*Primary Examiner*—John K. Ford

[57] ABSTRACT

An air conditioning apparatus for heating a cabin of an electric car having reduced electric power consumption is disclosed. An initial setting of the heating operation is that of using a refrigerating cycle 17. An average value of actual electric power consumption using the refrigerating cycle for a predetermined period is calculated. Furthermore, electric power consumption using an electric heater 20 is calculated for obtaining the same heating capacity as that obtained by the refrigerating cycle. A switching of the heating operation from the refrigerating cycle to the electric heater 20 takes place when it is determined that electric power consumption using the electric heater is less than that using the refrigerating cycle 17.

6 Claims, 9 Drawing Sheets

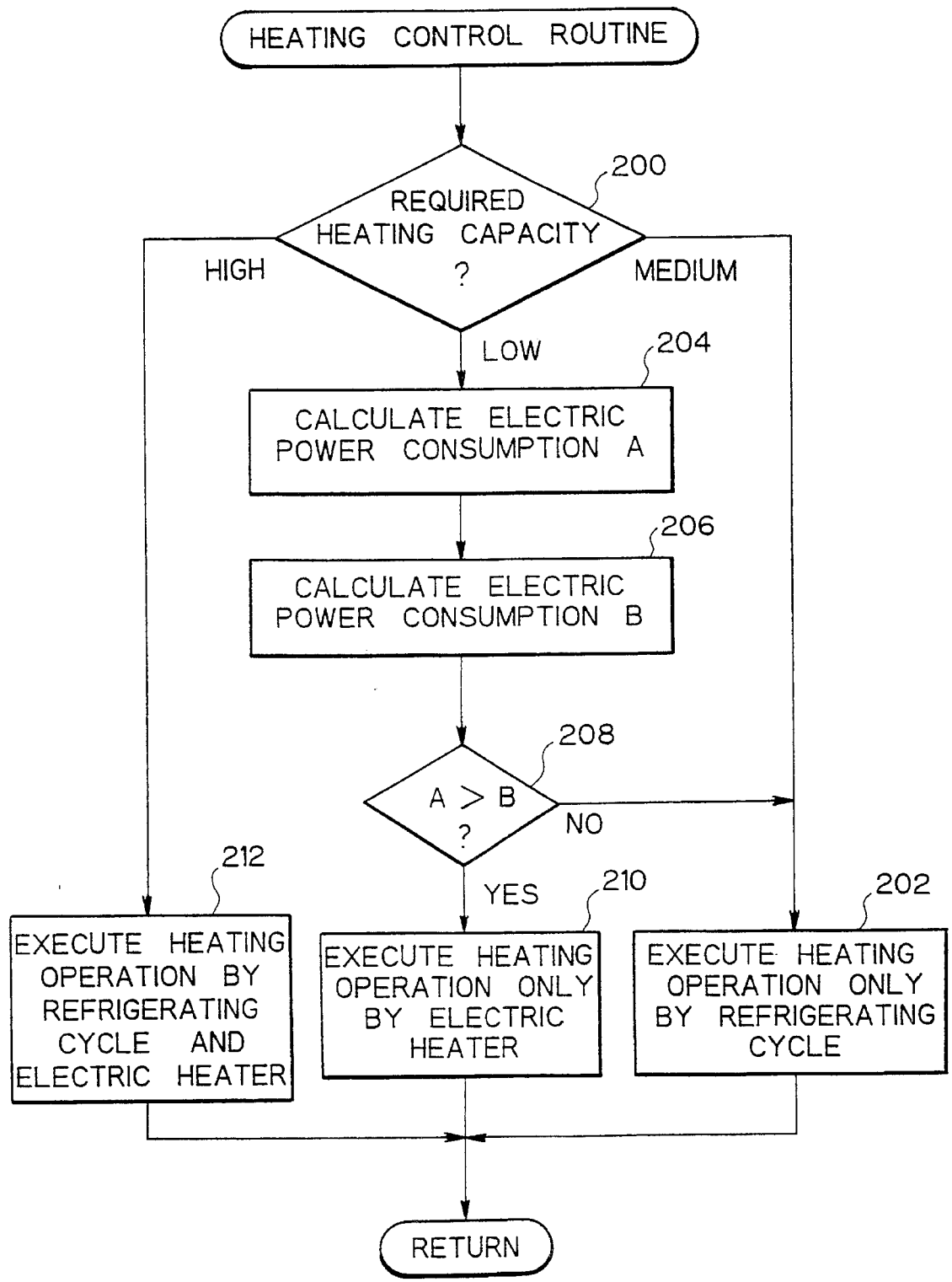

AIR CONDITIONING APPARATUS FOR AN ELECTRIC VEHICLE USING LEAST POWER CONSUMPTION BETWEEN COMPRESSOR AND ELECTRIC HEATER

BACKGROUND OF THE INVENTION

1. Field of the Invention

The present invention relates to an air conditioning apparatus capable of conducting a heating operation using a refrigerating cycle which is suitable, in particular, for an electric car.

2. Description of Related Art

A technique for heating air using a refrigerant compressor operated by an electric motor is known in the art. In this technique, the compressor is located in a refrigerating circuit which, in addition to the compressor, includes an inside heat exchanger as a condenser connected to the compressor for receiving a high temperature refrigerant, a pressure reduction device for reducing a pressure of the refrigerant from the inner heat exchanger, and an outside heat exchanger acting as an evaporator for receiving the pressure reduced refrigerant from the pressure reduction device and for returning the refrigerant to the compressor. The inner heat exchanger acting as a condenser is located in an air duct in which an air flow is created and discharged to the interior of the vehicle. At the inner heat exchanger, a heat exchange takes place between the air in the duct and the high temperature refrigerant, so that the air is heated while the refrigerant is cooled, thereby causing the refrigerant to condense. At the outside heat exchanger acting as an evaporator, a heat exchange takes place between the outside air and the refrigerant, so that heat is taken from the outside air while the refrigerant is heated, thereby causing the refrigerant to evaporate.

In such an air conditioning apparatus where the heating operation is carried out by the refrigerating cycle, a reduction in heating efficiency is inevitable when the temperature of the outside air is low, because the outside air is deprived of heat. Thus, a reduction in the outside air temperature will increase the work done by the compressor in maintaining a desired level of heating performance, which increases the electric power consumption of the motor. Furthermore, the increased work load of the compressor will increase the pressure of the refrigerant at the outlet of the compressor, thereby increasing the load of the compressor, which also increases the electric power consumption of the motor.

SUMMARY OF THE INVENTION

An object of the present invention is to provide an air conditioning apparatus using a refrigerant cycle for a heating operation that is capable of operating with a reduced electric power consumption.

According to the present invention, an air conditioning apparatus for controlling a temperature of a chamber is provided and comprises:

(a) a duct defining therein an air passageway to said chamber;

(b) a fan device for creating a forced air flow in said passageway toward the chamber;

(c) a refrigerating cycle comprising a compressor for obtaining a high pressure gaseous refrigerant, and an inner heat exchanger that receives the gaseous refrigerant from the compressor;

(d) said inner heat exchanger being arranged in the duct such that a heat exchange of the air in the duct with the refrigerant in the inner heat exchanger takes place for heating the air directed to the chamber;

(e) an electric motor for imparting a rotational movement to the compressor such that a recirculation of the refrigerant in the refrigerating cycle is obtained;

(f) an electric heater arranged in the duct for generating electric heat so as to directly heat the air flow directed to the chamber and, (g) control means for selecting the system between the refrigerating cycle and the electric heater that consumes less electric power for obtaining a desired chamber heating capacity.

BRIEF EXPLANATION OF ATTACHED DRAWINGS

Figure 3:
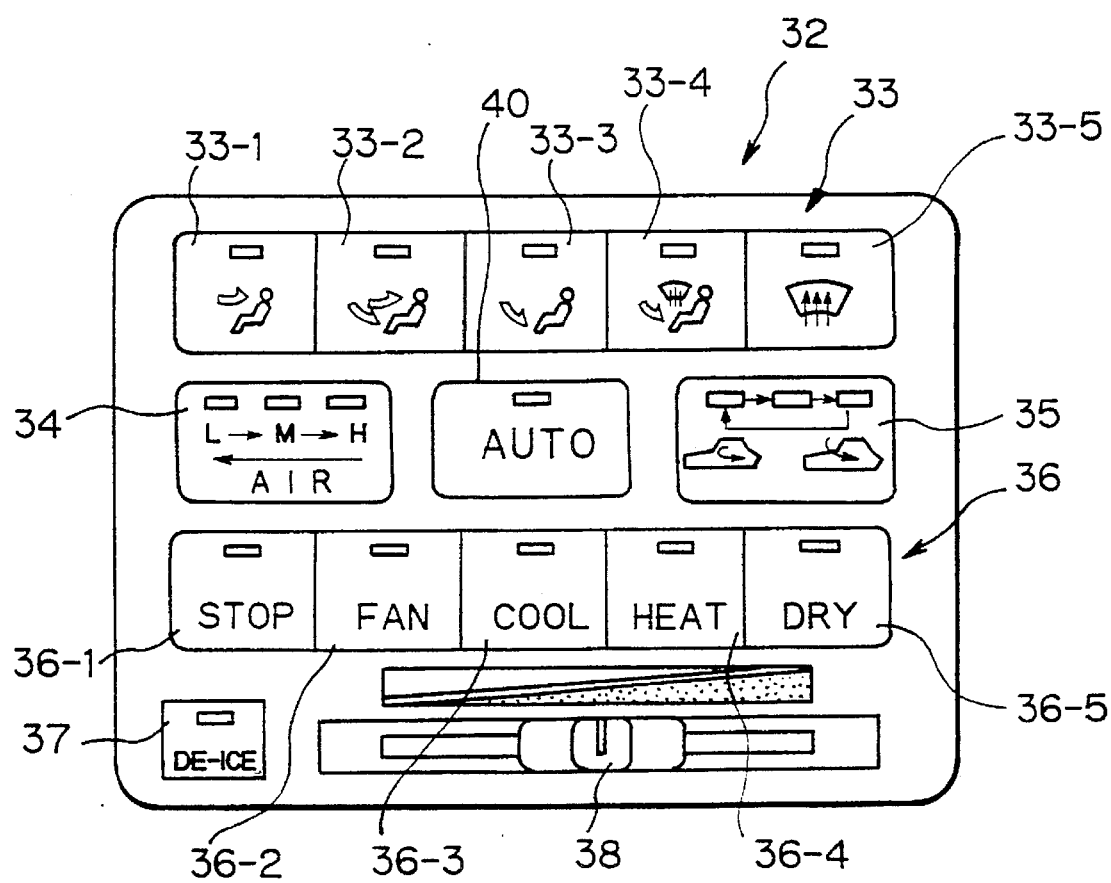

FIG. 3 schematically shows an arrangement of a control panel of the air conditioning apparatus in the interior of a vehicle.

Figure 4:
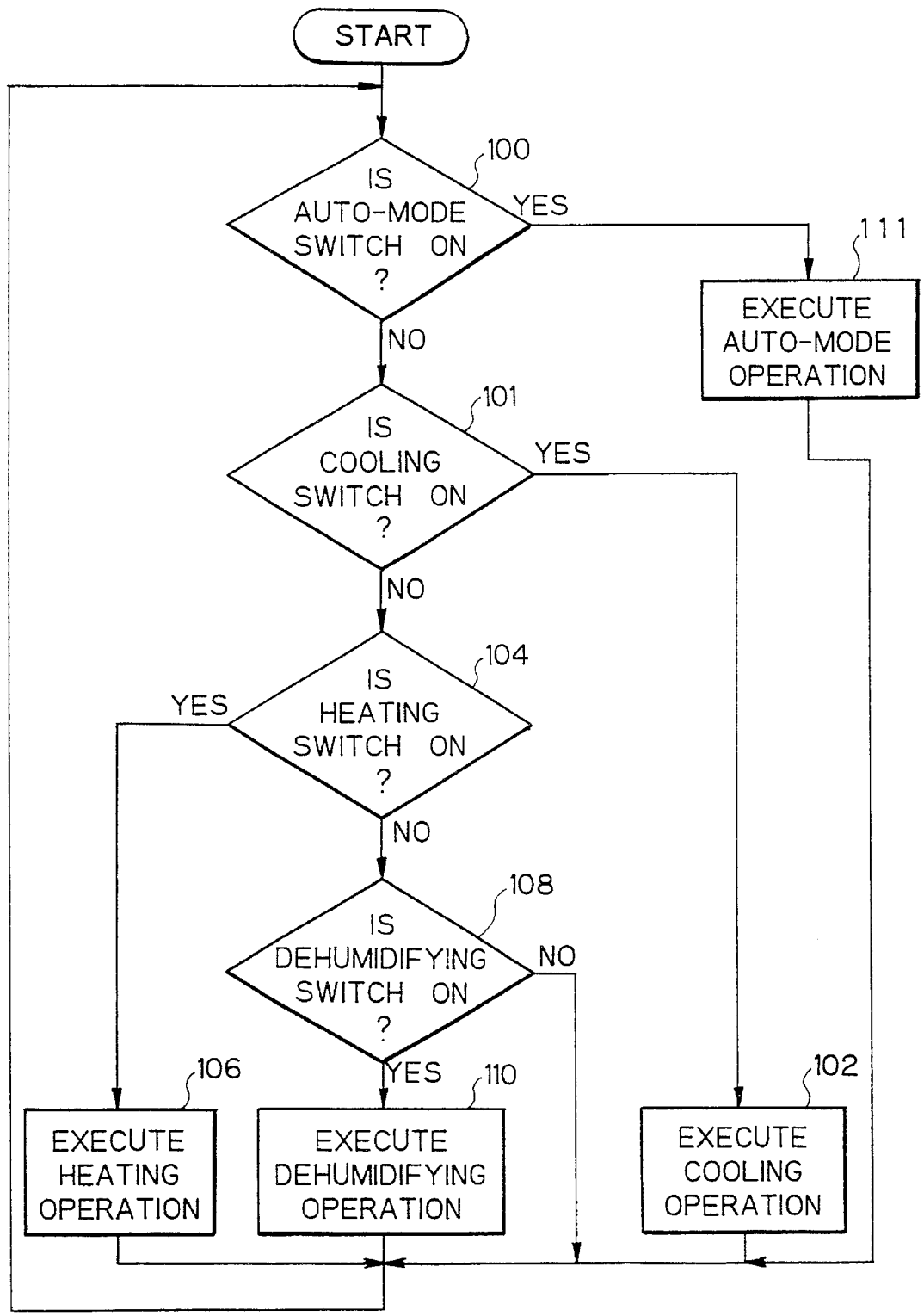
Figure 5:
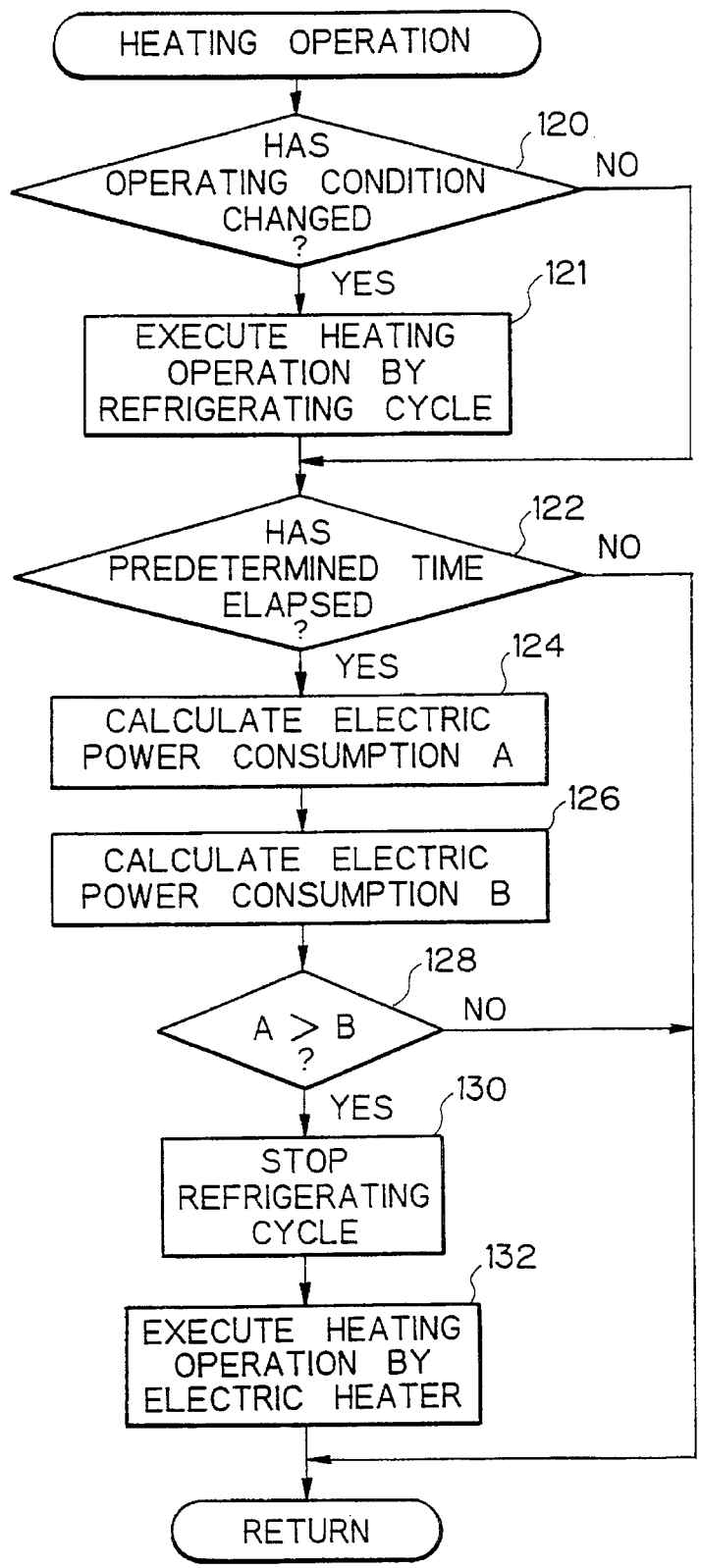

FIGS. 4 and 5 are flow charts generally illustrating the air conditioning apparatus in the first embodiment.

Figure 6:
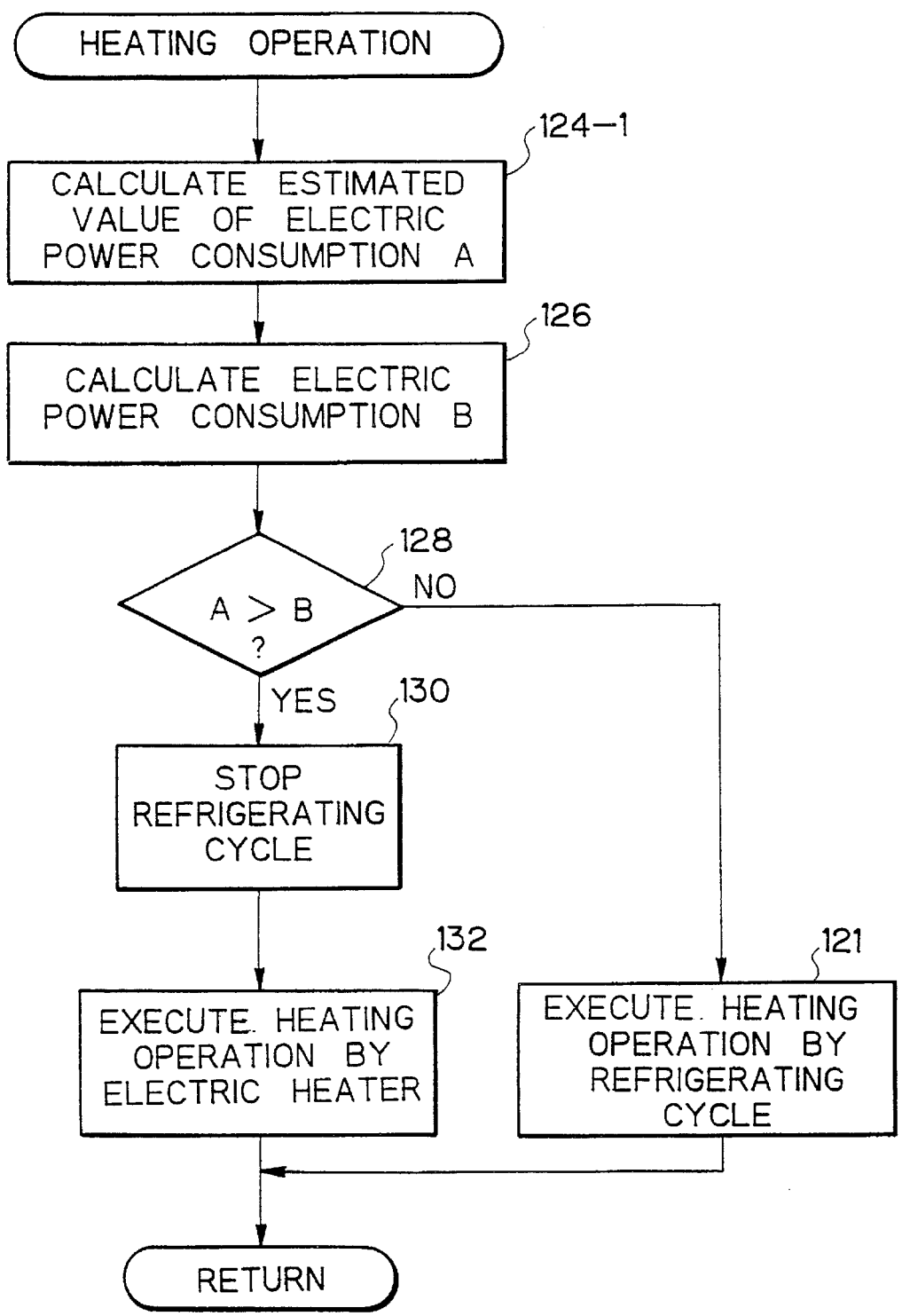

FIG. 6 is a flow chart for executing a heating operation in a second embodiment.

Figure 7:
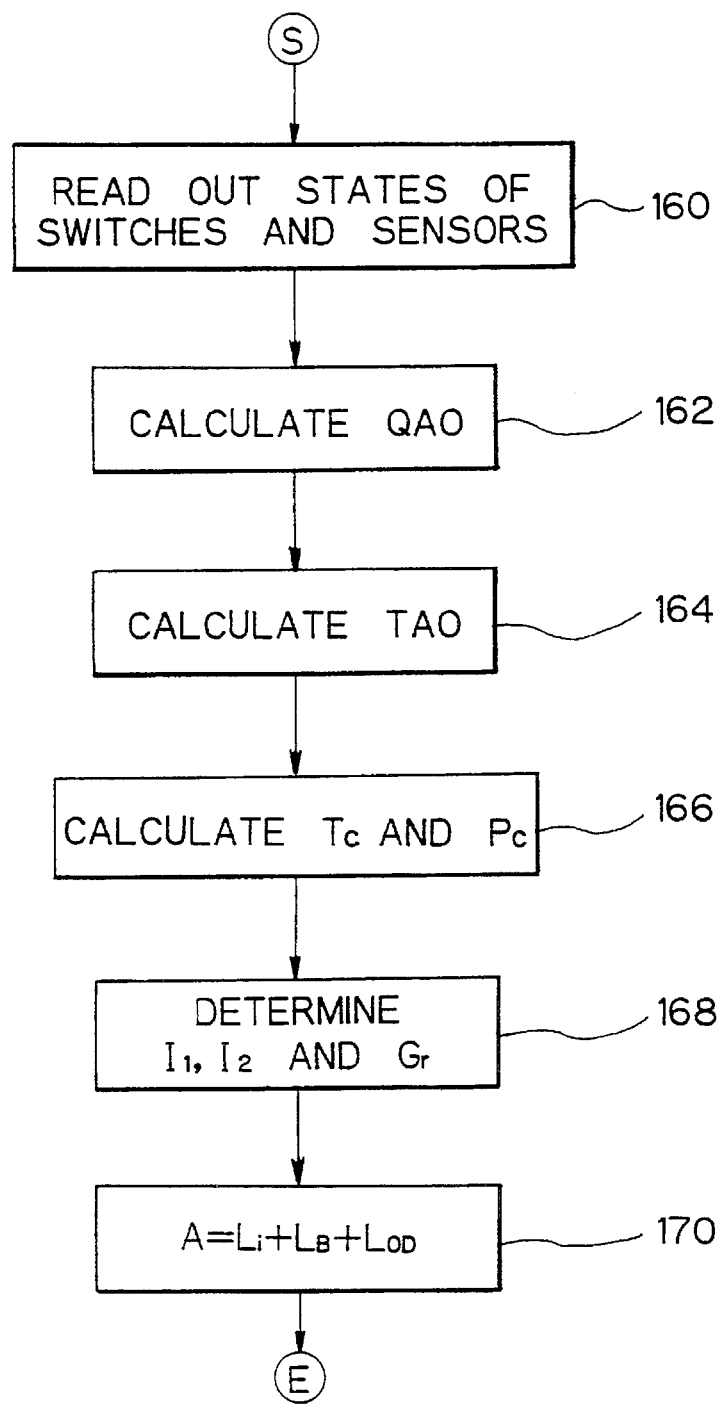
Figure 8:
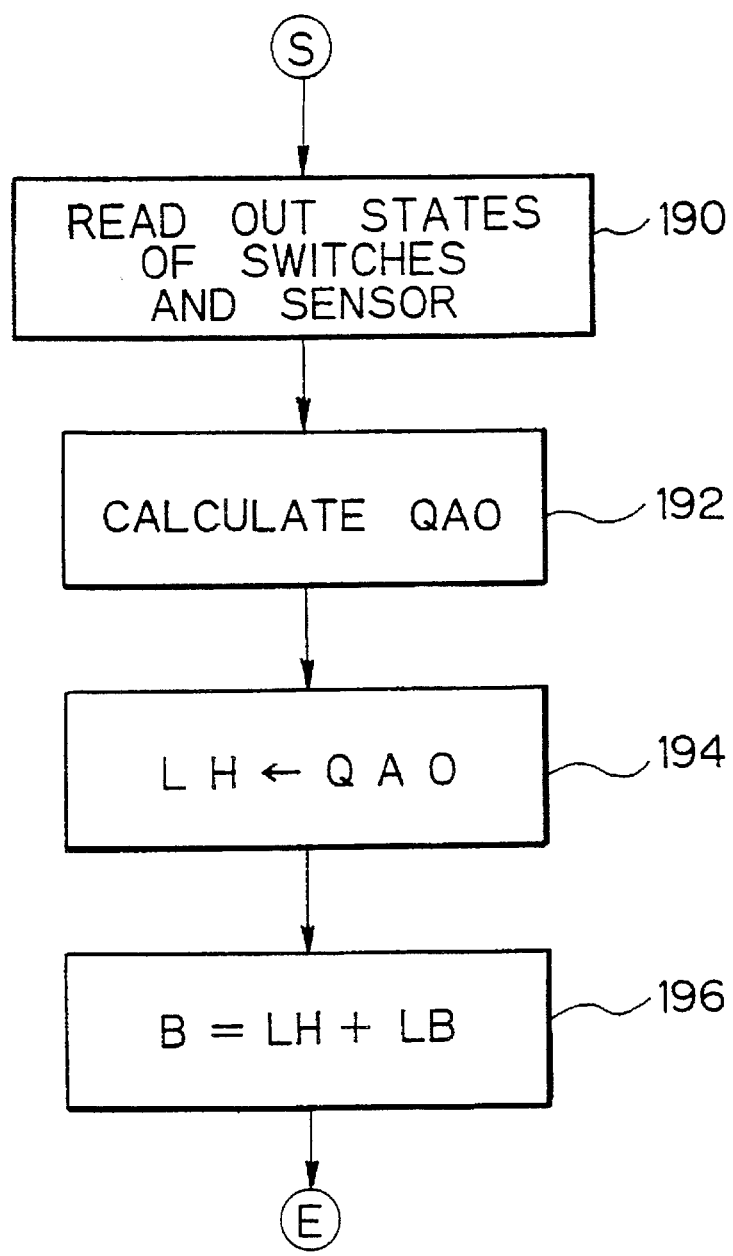

FIGS. 7 and 8 are routines for obtaining estimated values of electric power consumption during the heating operation using a refrigerating cycle and an electric heater, respectively, in the second embodiment.

FIG. 9 shows another embodiment of the invention.

DESCRIPTION OF PREFERRED EMBODIMENTS

Figure 1:
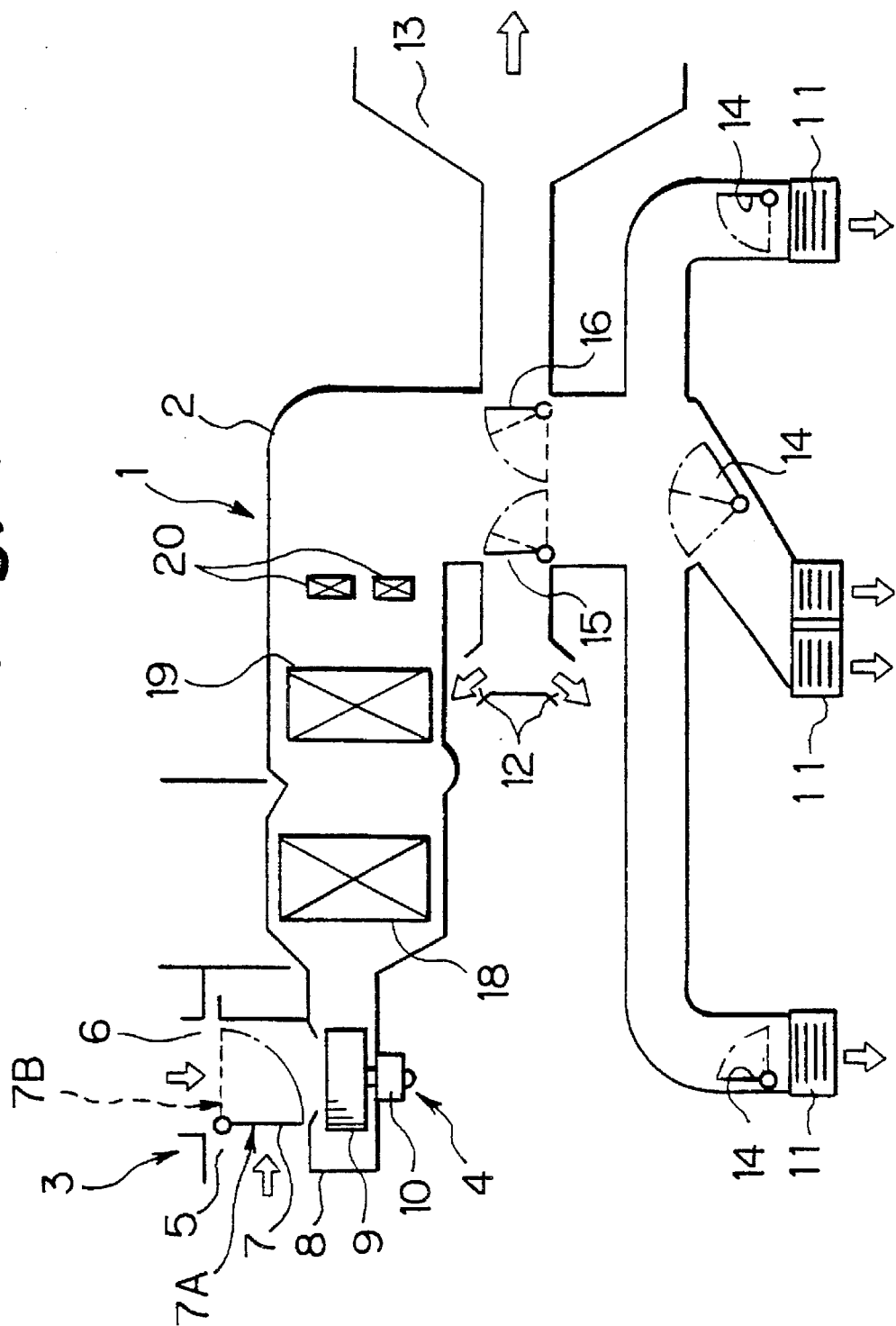
FIG. 1 is a schematic view of an air conditioning apparatus according to the present invention when used in an electric car.

In FIG. 1, which schematically shows an air conditioning apparatus for an electric car, reference numeral 1 generally illustrates an air conditioning apparatus. The air conditioning apparatus 1 includes a duct 2 defining therein a passageway for an air flow, which has at its inlet end a switching device 3 for switching an air inlet between a position for the introduction of inside air and a position for the introduction of outside air, and a blower device 4 for generating an air flow in the duct 2. An electric motor 10 is provided for imparting a rotational movement to the fan. The duct 2 has, at its first end, an inside air inlet 5 opened to the interior for the introduction of inside air in the interior after being subjected to a heat exchange, and an outside air inlet 6 for the introduction of outside air, and, at its second end, upper outlets 11 for discharging air flows (mainly cooled air) directed to an upper part (head) of a passenger, lower outlets 12 for discharging air flows (mainly hot air) directed to a lower part (legs) of the passenger, and a defroster outlet 13 for discharging air flows (mainly hot air) directed to the windshield (not shown) of a vehicle. Dampers 14 control the flow of air from the upper outlets 11, a damper 15 controls the flows of air from the lower outlet 12, and a damper 16 controls the flows of air from the defroster outlet 13.

The switching device 3 includes a damper 7 that is moved between an outside air introduction position 7A, as shown by a solid line, where the inside air inlet 5 is closed and the outside air inlet 6 is opened, and an inside air introduction position 7B, as shown by a dotted line, where the inside air inlet 5 is opened and the outside air inlet 6 is closed.

The blower device 4 includes a fan case 8, a fan 9 having an axial inlet and spaced radial outlets, and an electric motor 10 connected to the fan 9 for rotating the fan 9, thereby causing the inside air or outside air to be introduced into the duct 2.

Arranged in the duct 2 at a position downstream from the fan 9 is an upstream heat exchanger 18, purely for heating purposes, such that a heat exchange is obtained between all of the air flow in the duct 2 and a low temperature refrigerant in the heat exchanger 18 for cooling the air. Arranged in the duct 2 at a position downstream from the upstream heat exchanger 18, purely for cooling purposes, is a downstream heat exchanger 19 such that a heat exchange is obtained between all of the air flow in the duct 2 and a high temperature refrigerant in the heat exchanger 18 for heating the air. An auxiliary heater 20 is made as an electric heating element, such as a positive temperature coefficient (PTC) element for generating an amount of heat that varies in accordance with an electric current applied thereto.

Figure 2:
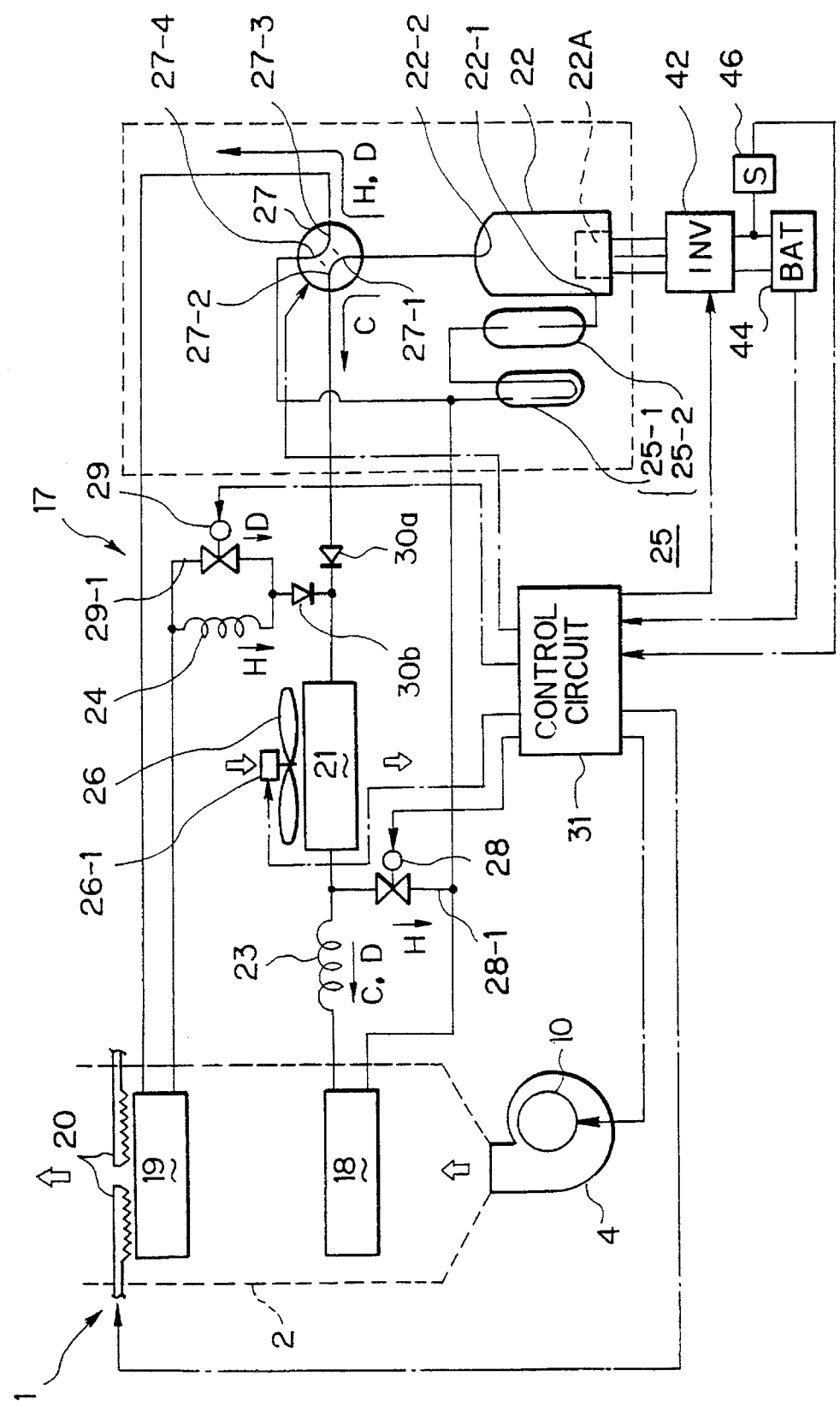
FIG. 2 shows refrigerating cycle in the air conditioning apparatus in FIG. 1 together with an air duct for air conditioning the vehicle.

In FIG. 2, a reference numeral 17 is a refrigerant cycle, which includes, in addition to the upstream and downstream heat exchangers 18 and 19, an outside heat exchanger 21, a compressor 22, a first pressure reduction device 23, a second pressure reduction device 24, an accumulator 25, and a four port two position flow direction switching valve 27. The outside heat exchanger 21 is for obtaining a heat exchange between the air outside the duct 2 and the refrigerant. An outside air fan 26 is arranged so as to face the outside heat exchanger 21 for obtaining a forced flow of outside air. The outside air flow fan 26 has an electric motor 26-1 for imparting a rotational movement to the fan 26.

The refrigerant compressor 22 has an inlet 22-1 for receiving a gaseous state refrigerant from the accumulator 25 and an outlet 22-2 for issuing the refrigerant under high pressure. The compressor 22 has an electric motor 22A for imparting a rotational movement to the compressor section. The compressor 22 and the electric motor 22A are arranged in a casing so that they are hermetically sealed. As will be described later, an inverter 42 is provided for obtaining a varied rotational movement speed from the electric motor 22A so that the amount of gaseous refrigerant issued from the outlet 22-2 of the compressor 22 varies continuously. Such a change in the refrigerant from the compressor 22 can control the temperature of the air issued from the duct 2 to the vehicle interior.

The first pressure reduction device 23 is constructed as a capillary tube for reducing the pressure of the refrigerant introduced into the upstream heat exchanger 18 from the outside heat exchanger 21. The second pressure reduction device 24 is also constructed as a capillary tube for reducing the pressure of the refrigerant introduced into the outside heat exchanger 21 from the downstream heat exchanger 19.

The accumulator 25 is constructed by a series of containers 25-1 and 25-2 for storing excess liquid refrigerant and for separating gaseous refrigerant that is introduced into the inlet 22-1 of the compressor 22.

The switching valve 27 has a first port 27-1 connected to the outlet 22-2 of the compressor 22, a second port 27-2 connected to the outside heat exchanger 21 via a check valve 30a, a third port 27-3 connected to the downstream heat exchanger 19, and a fourth port 27-4 connected to the accumulator 25. The switching valve 27 is moved between a first position (solid line) where the first and second ports 27-1 and 27-2 are connected and third and fourth ports 27-3 and 27-4 are connected, and a second portion (dotted line) where the first and third ports 27-1 and 27-3 are connected and the second and fourth ports 27-2 and 27-4 are connected.

A by-pass passageway 28-1 is connected to the refrigerant circuit 17 to by-pass the first pressure reduction device 23 and the upstream heat exchanger 18, which are connected in series. A normally closed first electromagnetic valve 28 is arranged on the by-pass passageway 28-1, and is energized during a heating operation for by-passing the first pressure reduction device 23 and the upstream heat exchanger 18, as shown by an arrow $\underline{H}$. A by-pass passageway 29-1 is connected to the refrigerant circuit 17 so as to by-pass the second pressure reduction device 24. A normally closed second electromagnetic valve 29 is arranged on the by-pass passageway 29-1, and is energized during a dehumidifying operation for by-passing the second pressure reduction device 24, as shown by an arrow $\underline{D}$. A check valve 30b is arranged between the point where the second pressure reduction device 24 and the by-pass passageway 29-1 are connected and the point where the check valve 30a is connected to the outside heat exchanger 21. The check valve 30b is for preventing the refrigerant from being introduced into the downstream heat exchanger 19 during a cooling operation, as will be seen later.

During a cooling operation, the switching valve 27 is in its first position, as shown by the solid line, where the first and second ports 27-1 and 27-2 are connected and third and fourth ports 27-3 and 27-4 are connected. The first electromagnetic valve 28 is de-energized (closed) and a second electromagnetic valve 29 is de-energized (closed). As a result, a recirculated flow of refrigerant is obtained in the following order, that is, the outlet 22-2 of the compressor, the first and second ports 27-1 and 27-2 of the electromagnetic valve 27 (arrow $\underline{C}$), the check valve 30a, the outside heat exchanger 21, the first pressure reduction device 23 (arrow $\underline{C}$), the upstream heat exchanger 18, the accumulator 25, and the inlet 22-1 of the compressor 22. In this case, the outside heat exchanger 21 operates as a condenser for liquidizing the refrigerant, and the upstream heat exchanger 18 operates as an evaporator for absorbing heat from the air in the duct, i.e., for cooling the air. During the cooling operation, the check valve 30b prevents the gaseous refrigerant from being introduced into the downstream heat exchanger 19. The liquid refrigerant in the downstream heat exchanger 19 is returned to the accumulator 25 via the fourth and third ports 27-3 and 27-4 of the switching valve 27.

During a heating operation, the switching valve 27 is in its second position as shown by the dotted line where the first and third ports 27-1 and 27-3 are connected and second and fourth ports 27-2 and 27-4 are connected. The first electromagnetic valve 28 is energized (opened), and a second electromagnetic valve 29 is de-energized (closed). As a result, a recirculated flow of refrigerant is obtained in the following order, that is, the outlet 22-2 of the compressor, the first and third ports 27-1 and 27-3 of the electromagnetic valve 27 (arrow $\underline{H}$), the downstream heat exchanger 19, the second pressure reduction device 24 (arrow $\underline{H}$), the check valve 30b, the outside heat exchanger 21, the first electromagnetic valve 28 (arrow $\underline{H}$), the accumulator 25, and the inlet 22-1 of the compressor 22. The upstream heat exchanger 18 operates as a condenser for liquidizing the refrigerant, and the outside heat exchanger 21 operates as a evaporator. Thus, heat is emitted from the downstream heat exchanger 19 to the air flow in the duct 2 for heating the air issued to the cabin.

During a dehumidifying operation, the switching valve 27 is in its second position, as shown by the dotted line, where the first and third ports 27-1 and 27-3 are connected and second and fourth ports 27-2 and 27-4 are connected. The first electromagnetic valve 28 is de-energized (closed), a second electromagnetic valve 29 is energized (opened). As a result, a recirculated flow of refrigerant is obtained in the following order, that is, the outlet 22-2 of the compressor, the first and second ports 27-1 and 27-3 of the electromagnetic valve 27 (arrow D), the downstream heat exchanger 19, the second electromagnetic valve 29 (arrow D), the check valve 30b, the outside heat exchanger 21, the first pressure reduction device 23 (arrow D), the upstream heat exchanger 18, the accumulator 25, and the inlet 22-1 of the compressor 22. In this case, the downstream heat exchanger 19 operates as a condenser for liquidizing the refrigerant, and the upstream heat exchanger 21 operates as an evaporator. Thus, the air is cooled at the upstream heat exchanger 18 and the dehumidifying air is heated at the downstream heat exchanger 19.

In FIG. 2, a control circuit 31 constructed as a microcomputer system is provided for controlling the auxiliary heater 20, the outside fan 26, the inverter 42 for the electric motor 22A of the compressor 22, the switching valve 27, the first and second electromagnetic valves 28 and 29, and the dampers 7, 14, 15 and 16 in FIG. 1.

FIG. 3 shows an arrangement of a control panel 32 for the control circuit 31 as a microcomputer in FIG. 2. The control panel 32 in FIG. 3 is arranged at a suitable location in the interior of the automobile. The panel 32 is provided with a mode selection section 33 for selecting a desired mode, an air amount control switch 34 for obtaining a desired amount of air flow into the cabin, an inlet selection switch 35 for selecting an air inlet between the inside air mode and the outside air mode, a mode selection section 36 for selecting a desired mode, a de-icing switch 37 for de-icing the outside heat exchanger 21 when using the heating mode, and a temperature control lever 38 for controlling the rotational speed of the compressor 22 at the respective modes as selected. The flow amount section 33 includes a high level mode function 33-1 for obtaining an air flow from the upper (ventilation) outlets 11, a bi-level mode function 33-2 for obtaining an air flow from both the upper and lower outlets 11 and 12, a bottom level mode function 33-3 for obtaining an air flow from the lower level outlets 12, a DEF/VENT mode function 33-4 for obtaining an air flow from both the defroster outlet 13 and the lower level outlet 12, and a defroster mode button 33-5 for obtaining an air flow from the defroster outlet 33-5. The air amount control switch 34 is for switching the amount of air in the duct 2 between a high (H), medium (M) and low (L) amounts. The selection switch 35 is for selecting between a condition where the outside air is introduced, a condition where the inside air is recirculated, and a condition where both the outside air introduction and the inside air recirculation takes place. The mode select section 36 includes a function 36-1 for stopping the operation of the system, a function 36-2 for controlling the operation of the fan 4, a function 36-3 for obtaining a cooling operation, a function 36-4 for obtaining a heating operation, and a function 36-5 for obtaining a dehumidifying (DRY) operation. In addition to the above, on the panel 32, an automatic temperature control switch 40 is provided for automatically determining various operations such as an air outlet mode selection, an air amount control and an air inlet switching operation in accordance with the target temperature of the air to be sent to the interior of the vehicle.

In FIG. 2, an inverter 42 is for changing a direct current from a battery 44 to an AC current with a frequency that changes in a continuous or a step like manner, and which is applied to the electric motor 22A of the compressor 22, so that the rotational speed of the compressor 22 is controlled so as to obtain a desired outlet volume of refrigerant from the outlet 22-2 of the compressor 22 for controlling the temperature of the air issued to the interior of the vehicle.

According to the present invention, upon starting a heating operation, the control circuit 31 compares the electric power consumed if the refrigerating cycle 17 is selected with the power consumed if an electric heater 20 is selected, and the heating operation that consumes a smaller amount of electric power is selected. According to this embodiment, in order to measure the electric power consumed when undergoing an heating operation using the refrigerating cycle 17, a value of the electric power consumed at the electric motor 22A for operating the compressor 22 and the inverter 42 are directly measured, to which the electric power consumed by the fan 4 and the electric power consumed by the outside fan 26 are added. An average value of the added values for a predetermined period in a range between 5 to 20 minutes is obtained as the electric power consumed by the refrigerating cycle. In order to do this, as shown in FIG. 2, a sensor 46 is provided for detecting a value of the direct current applied from the battery 44 to the inverter 42, so that the electric power consumed at the electric motor 22A for driving the refrigerant compressor 22 and the inverter 42 can be obtained. Electric power consumption by the fan 4 can be calculated from the set value of the electric voltage applied to the electric motor 10 of the fan 4, which is determined by the control circuit 31. The set value is controlled by the setting of the air flow amount control switch 34. Electric power consumption by the outside fan 26 is calculated based on the set voltage value of the electric motor 26-1, which is also determined by the control circuit 31.

The electric power consumed when undergoing an heating operation using the electric heater 20 is calculated as a sum of electric power consumption by the heater 20 as the target heating capacity calculated from the difference in the target temperature determined by the position of the temperature control lever 38 and the temperature of the air drawn and by the set value of the air using the fan 4, and of electric power consumed by the fan 4 determined by the set air amount using the fan 4.

It should be noted that the initial setting when the heating operation is selected is the heating operation using the refrigerating cycle.

FIG. 4 shows very generally a flow chart of a routine executed by the control circuit 31 for controlling the air conditioning apparatus according to the present invention. At step 100 it is determined whether the auto-mode switch 40 is ON. When the auto-mode switch 40 is OFF, the routine goes to step 101, where it is determined if the cooling switch is ON. When the cooling button 36-3 has been pushed, the cooling switch is made ON, so that the routine goes to step 102, where the cooling operation is executed. As already explained, during the cooling operation, the flow of refrigerant as shown by the arrow C in FIG. 2 is obtained.

When it is not undergoing a cooling operation at step 101, the routine goes to step 104, where it is determined whether the heating switch is ON. When the heating button 36-4 is pushed, the heating switch is made ON, so that the routine goes to step 106, where the heating operation is executed by the refrigerating cycle 17 and the electric heater 20, which involve less electric power consumption. As already explained, upon undergoing an heating operation by the refrigerating cycle, the flow of refrigerant, as shown by the arrow H in FIG. 2, is obtained.

When not undergoing an heating operation at step 104, the routine goes to step 108, wherein it is determined whether the dehumidifying switch is ON. When the dehumidifying button 36-5 is pushed, the dehumidifying switch is turned ON, so that the routine goes to step 110, where the dehumidifying operation is executed. As already explained, during the dehumidifying operation, the flow of refrigerant, as shown by the arrow $\underline{D}$ in FIG. 2 is obtained.

When it is determined that the auto-mode switch 40 is ON, the routine goes to step 111, where the auto-mode operation is carried out. Namely, in accordance with the desired temperature, a heating operation or cooling operation is automatically selected as is done in a well known manner.

FIG. 5 shows a heating operation executed at step 106 in FIG. 4 or step 111 when the heating operation is carried out during the auto-mode operation. At step 120, it is determined whether this is the first cycle to be executed after the heating switch is turned on or a heating condition is changed by operating the temperature control lever 38 or air control switch 34. When it is determined that this is the first cycle after the heating button 36-4 is pushed or the heating conduction is changed by moving the temperature control lever 38 or air amount control switch 34, the routine goes to step 121, where the heating operation using the refrigerating cycle 17 is executed. In this case, the flow of refrigerant as shown by the arrows $\underline{H}$ is obtained, and the rotational speed of the compressor 22 is controlled in accordance with the position of the temperature control lever 38. The routine then flows to step 122, where it is determined whether a predetermined time TI has elapsed after it is determined, at step 120, that the heating switch is turned on or a heating operation is varied. This predetermined time TI is a value in a range, for example, between 5 to 20 minutes, for obtaining a stable heating operation by the refrigerating cycle 17. When the predetermined time interval TI has not elapsed, the steps 124 to 132 are by-passed, and returned to the main routine.

When it is determined that the predetermined time TI has elapsed at step 122, the routine goes to step 124, where the electric power consumption $\underline{A}$ for the heating operation by the refrigerating cycle 17 is calculated based on set values of the air flow of the inside fan 4 and the outside fan 26 and on the electric power consumption by the electric motor 22A and inverter circuit 42 obtained from the electric current sensed by the electric current sensor 46. The routine then goes to step 126, where the electric power consumption $\underline{B}$ by the electric heater 20 is calculated for obtaining the same heating capacity as obtained by the heating operation using the refrigerating cycle 17. The electric power consumption $\underline{B}$ is a sum of the electric power consumption of the fan 4 obtained from the setting of the air amount using the switch 34 and the electric power consumption by the electric heater 20 obtained from a difference of the setting of the temperature of the air by the control lever 38 from the air temperature as introduced. The routine then goes to step 128, where it is determined if the electric power consumption $\underline{A}$ of the heating operation using the refrigerating cycle 17 is larger than the electric power consumption $\underline{B}$ of the heating operation using the electric heater 20. When it is determined that $\underline{A} \leq \underline{B}$, the routine by-passes step 130 and 132, so that execution of the heating operation by the refrigerating cycle continues.

The change in heating conditions makes the heating operation using the electric heater much more economical than the heating operation using the refrigerating cycle. In this situation, it is determined that the electric power consumption $\underline{A}$ of the heating operation using the refrigerating cycle 17 is larger than the electric power consumption $\underline{B}$ of the heating operation using the electric heater 20 at step 128, so that the routine now flows to step 130, where the refrigerating cycle is stopped, i.e., the rotation of the compressor 22 is stopped, and to step 132, where the heating operation using the electric heater 20 is executed. Thus, the electric current to the electric heater 20 is controlled in accordance with the position of the temperature control lever 38.

As is clear from the above, according to the first embodiment, even in the case that the heating operation using the electric heater 20 is selected for a preceding cycle, a switch to another mode by the mode selection switch 36 or an increase in the air flow amount by the air amount control switch 34 or a change in the position of the temperature control lever 38 causes an affirmative determination at step 120, so that the electric heater is at least once stopped, and the heating operation using the refrigerating cycle 17 is started at step 121 for at least the period TI so as to check whether electric power consumption using the refrigerating cycle is larger than that using the electric heater 20 to obtain the same heating capacity (steps 124 to 128).

According to the embodiment of the present invention, during the heating operation using the refrigerating cycle 17, a calculated value of the electric power consumed by the heating operation using the electric heater larger than the electric power consumed during the refrigerating cycle causes the heating operation to change to that using the electric heater. As a result, an effective use of the electric power of the battery 44 of an automobile is obtained, so that the service life of the battery before a charging operation is required can be prolonged.

Furthermore, the upstream heat exchanger 18 and the downstream heat exchanger 19 arranged in the duct 2 always operate as the evaporator and the condenser, respectively, irrespective of the mode selected. As a result, a change in the mode does not cause the heat exchanger 18 or 19 to switch its function between the evaporator and the condenser. As a result, a change in the mode does not result in the drain water evaporating; thus, condensation does not form on the windshield.

It should be noted that the air conditioning apparatus according to the present invention is suitable for an electric car without an additional heating source.

FIG. 6 shows a second embodiment of the present invention. This embodiment features steps 120 to 122 in FIG. 5 eliminated, and, at step 124-1 corresponding to step 124 in FIG. 5, an estimated value of electric power consumption $\underline{A}$ using the refrigerating cycle is calculated. Namely, in this embodiment, steps for operating the refrigerating cycle for a time TI so as to obtain an actual value of electric power consumption $\underline{A}$ are eliminated. FIG. 7 is a detail of step 124-1 for calculating the estimated value of electric power consumption $\underline{A}$. Namely, at step 160, setting of the various switches and output of various sensors, such as the set temperature $T_{set}$ by the temperature control lever 38, the inside air temperature $T_r$, the outside air temperature $T_{am}$, and the sun radiation amount $T_s$. At step 162, a target heating capacity QAO is calculated using the following equation.

$$QAO = K1 \times T_{set} - K2 \times T_r - K3 \times T_{am} - K4 \times T_s + C,$$

where are K1, K2, K3 and K4 are predetermined factors and C is a constant.

At step 164, based on the target heating capacity QAO, the set value of the air amount Va by the fan 4 including that determined in the auto-mode or that determined in the manual mode, and the inside temperature $T_r$ in the inside air inside mode or the outside air temperature $T_{am}$ in the outside air inlet mode, a target air temperature TAO issued to the cabin is calculated by the following equation.

$$TAO = \frac{QAO}{C} \times Cp \times \gamma \times Va + T_r \text{ or,}$$

$$TAO = \frac{QAO}{C} \times Cp \times \gamma \times Va + T_{am},$$

where Cp is specific heat, and is $\gamma$ specific weight.

Then, at step 166, a condensing temperature $T_c$ at the downstream heat exchanger 19 and a saturated pressure $P_c$ of the refrigerant corresponding to the condensing temperature $T_c$ are calculated based on the inside air temperature $T_r$ when the inside air inlet mode is selected or the outside air temperature $T_{am}$ when the outside air inlet mode is selected as the target air temperature TAO as issued to the cabin, and the temperature efficiency $\phi_{ac}$ at the downstream heat exchanger 19. The condensing temperature $T_c$ is calculated by the following equation.

$$T_c = T_r + \frac{TAO - T_r}{\phi_{ac}} \text{ or,}$$

$$T_c = T_{am} + \frac{TAO - T_{am}}{\phi_{ac}}$$

Next, at step 168, an intake enthalpy $I_1$ at the inlet side of the compressor 22, an outlet enthalpy $I_2$ at the outlet side of the compressor, and the recirculated amount $G_r$ of the refrigerant are calculated. Namely, first, the evaporation temperature $T_e$ at the outside heat exchanger 21, a saturated evaporation pressure $P_e$, and a recirculated amount $G_r$ of the refrigerant are estimated. Then, using these estimated values, the outlet enthalpy $I_2$ is calculated. This outlet enthalpy $I_2$ is calculated by the following equation.

$$I_2 = \frac{\kappa}{\kappa - 1} \times P_e \times V_e \times \frac{\left(\frac{P_c}{P_e}\right)^{\frac{\kappa-1}{\kappa}} - 1}{\chi} - I_1, \text{ and}$$

$$\chi = \eta_c \times \eta_m \times \eta_{mo},$$

where $\kappa$ is adiabatic index, $V_e$ is a specific volume, $\eta_c$ is adiabatic compression efficiency, $\eta_m$ is a machine efficiency, and $\eta_{mo}$ is a motor efficiency. Then, the outlet side enthalpy $I_3$ at the downstream heat exchanger 19 is calculated by the following equation.

$$I_3 = I_2 - \frac{QAO}{G_r}$$

Then, a heat exchange capacity $Q_{re}$ at the refrigerant side of the outside heat exchanger 21 and a heat exchanging capacity $Q_{ae}$ at the air side are calculated by the following equations.

$$Q_{re} = G_r \times (I_1 - I_3)$$

$$Q_{ae} = V_e \times \gamma \times (I_{am} - I_e) \times \phi_{ac}$$

where $I_{am}$ is an enthalpy of the outside air, and $_e$ is an enthalpy of the air corresponding to an evaporation temperature at the outside heat exchanger 21.

Then, the heat exchanging capacity $Q_{re}$ at the refrigerant side and the heat exchanging capacity $Q_{ae}$ at the air side are compared, and the heat exchanging capacity $Q_{re}$ at the refrigerant side and the heat exchanging capacity $Q_{ae}$ at the air side are substantially equalized by varying the evaporation temperature $T_e$, the saturated vapor pressure $P_e$ and the recirculated amount $G_r$ of the refrigerant at the outside heat exchanger 21, as estimated above. When the heat exchanging capacity $Q_{re}$ at the refrigerant side and the heat exchanging capacity $Q_{ae}$ at the air side are substantially equalized, the values of the intake enthalpy $Q_{re}$, the outlet enthalpy 12 and the recirculated amount $G_r$ of the refrigerant are determined.

Finally, at step 170, based on the calculated intake enthalpy $I_1$, the discharge enthalpy $I_2$, and the refrigerant recirculated amount $G_r$, a value of the inlet electric current $L_i$ to be applied to the inverter circuit 42 is calculated by the following equation.

$$L_i = (I_2 - I_1) \times \frac{G_r}{\eta_i}$$

where $\eta_i$ is inverter efficiency at the inverter circuit 42. The estimated value of the electric power consumption $\underline{A}$ during the heating operation using the refrigerating cycle is then calculated from the inlet electric current $L_i$ added by the electric power consumption $L_B$ by the set air amount by the fan 4 and the electric power consumption $L_{OD}$ by the set air amount by the outside fan 26.

FIG. 8 are details of step 126 in FIG. 6 for obtaining an estimation of electric power consumption by the electric heater. Steps 190 and 192 are the same as steps 160 and 162 in FIG. 6. Namely, based on the detected operating conditions, a target heating capacity QAO is calculated. At step 194, the calculated heating capacity QAO is moved to the inlet electric current of the electric heater 20 $L_H$. At step 196, a value of electric power consumption $L_B$ by fan 4 is added to the value of $L_H$ to obtain an estimated value of electric power consumption during the heating operation using the electric heater 20. It should be noted that the routine in FIG. 8 corresponds to details of the routine at step 126 in FIG. 5 of the first embodiment. In this second embodiment, different from the first embodiment in FIG. 5, electric power consumption during the heating operation using the refrigerating cycle can be calculated without executing a heating operation using the refrigerating cycle. Namely, the heating operation is eliminated when, upon starting the heating operation, electric power consumption by the electric heater is smaller than that using the refrigerating cycle. Thus, a further reduction in electric power consumption for the heating operation can be attained.

FIG. 9 shows another embodiment, wherein the heating operation is switched between that using only the refrigerating cycle, that using only the electric heater, and that using both the refrigerating cycle and the electric heater. In FIG. 8, at step 200, it is determined whether a required heating capacity is low, medium or high, and when the required heating capacity is medium, the routine proceeds goes to step 202 where only the refrigerating cycle is carried out. When the heating requirement is low, steps 204 to 208 are executed. Namely, at step 204, electric power consumption $\underline{A}$ using the refrigerating cycle, and at step 206, electric power consumption $\underline{B}$ using the electric heater 20 are calculated. At step 208, it is determined that the value of $\underline{A}$ is larger than the value of $\underline{B}$, and when electric power consumption $\underline{A}$ using the refrigerating cycle is smaller than electric power consumption $\underline{B}$ using the electric heater 20, the routine proceeds to step 202, where a heating operation using only the refrigerating circuit 17 is realized. When electric power consumption $\underline{B}$ by the electric heater 20 is smaller than electric power consumption $\underline{A}$ by the refrigerating cycle, the routine proceeds to step 210, where a heating operation using only the electric heater 20 is realized. When the required heating capacity is high, the routine proceeds to step 212, where the heating operation using both the refrigerating cycle and the electric heater 20 is executed.

In the second or third embodiment where both estimated values of electric power consumption A and B are calculated, the heating operation that provides a smaller value is selected. In this case, a hysteresis is provided so that once one of the heating operations of the refrigerating cycle and the electric heater is selected because one provides smaller electric power consumption, switching to the other heating operation is allowed to occur when electric power consumption thereof becomes larger than the other by a predetermined small value. This hysteresis is to prevent the occurrence of so-called "hunting".

Control of the volume of the refrigerant compressor for varying the heating capacity using the refrigerating cycle in the above embodiment can be replaced by the provision of an air mix damper for controlling the ratio of the amount of air in contact with the heat exchanger for heating the air equal to the amount of air by-passing the heat exchanger, for heating the air.

Control of the electric current to the electric heater 20 for varying the heating volume can be replaced by the provision of an air mix damper for controlling the ratio of the amount of air contacting the electric heater to the amount of air by-passing the electric heater.

The numerical figures in the flowcharts are purely for illustration purposes, and the present invention should not be limited to such numerical values.

In the embodiment, the upstream heat exchanger always operates as an evaporator. However, the present invention can also be applied to a refrigerating cycle, where the upstream heat exchanger operates as a condenser.

In the embodiment, the downstream heat exchanger always operates as an condenser. However, the present invention can also be applied to a refrigerating cycle, where the downstream heat exchanger operates as a condenser.

In the embodiment, the air conditioning apparatus is for air conditioning the interior of an automobile. The present invention can also be applied to an air conditioning apparatus for domestic or industrial use.

We claim:

1. An air conditioning apparatus for controlling a temperature of a cabin, comprising:
   (a) a duct defining therein an air passageway to said cabin;
   (b) a fan device for creating a forced air flow in said passageway toward the cabin;
   (c) a refrigerating cycle comprising a compressor for obtaining a high pressure gaseous refrigerant, and an inner heat exchanger that receives the gaseous refrigerant from the compressor, said inner heat exchanger being arranged in the duct so that a heat exchange between the air in the duct and the refrigerant in the inner heat exchanger takes place to heat the air directed to the cabin;
   (d) an electric motor for imparting a rotational movement to the compressor to recirculate the refrigerant along the refrigerating cycle;
   (e) an electric heater arranged in the duct for generating electric heat for directly heating the air flow directed to the cabin;
   (f) means for determining electrical power consumption of the refrigerating cycle and for determining electrical power consumption of the electric heater; and
   (g) control means for selecting the one of the refrigerating cycle and the electric heater that consumes less electric power when obtaining a desired heating capacity at the cabin.

2. An air conditioning apparatus according to claim 1, further comprising means for detecting a degree of the heating as required, and means for operating both the refrigerating cycle and the electric heater when the heating requirement is larger than a predetermined value.

3. An air conditioning apparatus for controlling a temperature of a cabin, comprising:
   (a) a duct defining therein an air passageway to said cabin;
   (b) a fan device for creating a forced air flow in said passageway toward the cabin;
   (c) a refrigerating cycle comprising a compressor for obtaining a high pressure gaseous refrigerant, and an inner heat exchanger that receives the gaseous refrigerant from the compressor, said inner heat exchanger being arranged in the duct so that a heat exchange between the air in the duct and the refrigerant in the inner heat exchanger takes place to heat the air directed to the cabin;
   (d) an electric motor for imparting a rotational movement to the compressor to recirculate the refrigerant along the refrigerating cycle;
   (e) an electric heater arranged in the duct for generating electric heat for directly heating the air flow directed to the cabin; and
   (f) control means for selecting the one of the refrigerating cycle and the electric heater that consumes less electric power when obtaining a desired chamber heating capacity; wherein said control means includes
   means for obtaining a value of electric power consumption when using the refrigerating cycle for heating the cabin,
   means for obtaining a value of electric power consumption when using the electric heater for obtaining the same heating capacity as that obtained by the refrigerating cycle,
   means for comparing the value of electric power consumption when using the refrigerating cycle with the value of electric power consumption when using the electric heater, and
   means for selecting one of said refrigerating cycle and said electric heater that provides a smaller value of electric power consumption.

4. An air conditioning apparatus according to claim 3, wherein said means for obtaining a value of electric power consumption when using the refrigerating cycle comprises means for detecting operating parameters of the air conditioning apparatus, and means, based on the detected operating parameters, for calculating electric power consumption when during the heating operation using the refrigerating cycle.

5. An air conditioning apparatus for controlling a temperature of a cabin, comprising:
   (a) a duct defining therein an air passageway to said cabin;
   (b) a fan device for creating a forced air flow in said passageway toward the cabin;
   (c) a refrigerating cycle comprising a compressor for obtaining a high pressure gaseous refrigerant, and an inner heat exchanger that, receives the gaseous refrigerant from the compressor, said inner heat exchanger being arranged in the duct so that a heat exchange between the air in the duct and the refrigerant in the inner heat exchanger takes place to heat the air directed to the cabin;
   (d) an electric motor for imparting a rotational movement to the compressor to recirculate the refrigerant along the refrigerating cycle;

(e) an electric heater arranged in the duct for generating electric heat for directly heating the air flow directed to the cabin; and (f) control means for selecting the one of the refrigerating cycle and the electric heater that consumes less electric power when obtaining a desired chamber heating capacity; wherein said control means includes means for obtaining a value of electric power consumption when using the refrigerating cycle for heating the cabin comprising means for operating the refrigerating cycle for a predetermined period, and means for measuring actual electric power consumption using the refrigerating cycle when obtaining a required level of heating, means for obtaining a value of electric power consumption when using the electric heater for obtaining the same heating capacity as that obtained by the refrigerating cycle, means for comparing the value of electric power consumption when using the refrigerating cycle with the value of electric power consumption when using the electric heater, and means for selecting one of said refrigerating cycle and said electric heater that provides a smaller value of electric power consumption.

6. An air conditioning apparatus for an electric car cabin, comprising:

(a) a duct defining therein an air passageway that has at its first end an inlet for inside air and an inlet for outside air, and, at its second end an outlet for discharging air to the cabin;

(b) a switching means for switching between a position where the inside inlet is connected to the air passageway and a second position where the outside inlet is connected to the passageway;

(c) a fan device for creating a forced air flow in said passageway toward the cabin;

(d) a refrigerating cycle comprising a compressor for obtaining a high pressure gaseous refrigerant, and an inlet heat exchanger that receives the gaseous refrigerant from the compressor, said inner heat exchanger being arranged in the duct so that a heat exchange between the air in the duct and the refrigerant in the inner heat exchanger takes place for heating the air directed to the cabin;

(e) an electric motor for imparting a rotational movement to the compressor so that a recirculation of the refrigerant along the refrigerating cycle is obtained;

(f) an electric heater arranged in the duct for generating electric heat for directly heating the air flow directed to the cabin; and (g) control means for selecting one of the refrigerating cycle and the electric heater that consumes less electric power when obtaining a desired heating capacity at the cabin by comparing the electric power consumption when using the refrigerating cycle with the electric power consumption when using the electric heater.

* * * * *